US009365399B2

(12) United States Patent
Hofmann et al.

(10) Patent No.: US 9,365,399 B2
(45) Date of Patent: Jun. 14, 2016

(54) RESETTING DEVICE

(71) Applicant: Siemag Tecberg GmbH, Haiger (DE)

(72) Inventors: Klaus Hofmann, Netphen (DE); Dennis Heisinger, Dillenberg (DE); Matthias Koch, Herborn (DE); Karol Nyga, Bierun (PL)

(73) Assignee: SIEMAG Tecberg GmbH, Haiger (DE)

( * ) Notice: Subject to any disclaimer, the term of this patent is extended or adjusted under 35 U.S.C. 154(b) by 0 days.

(21) Appl. No.: 14/362,319

(22) PCT Filed: Nov. 30, 2012

(86) PCT No.: PCT/EP2012/074159
§ 371 (c)(1),
(2) Date: Jun. 2, 2014

(87) PCT Pub. No.: WO2013/079699
PCT Pub. Date: Jun. 6, 2013

(65) Prior Publication Data
US 2014/0326569 A1  Nov. 6, 2014

(30) Foreign Application Priority Data
Dec. 2, 2011 (DE) .......................... 10 2011 120 047

(51) Int. Cl.
F16D 11/14 (2006.01)
B66B 15/06 (2006.01)
B66D 1/16 (2006.01)
B66D 1/26 (2006.01)
F16D 11/04 (2006.01)
B66B 15/02 (2006.01)
B66B 15/00 (2006.01)
F16D 11/00 (2006.01)

(52) U.S. Cl.
CPC . *B66D 1/16* (2013.01); *B66B 15/00* (2013.01); *B66B 15/02* (2013.01); *B66B 15/06* (2013.01); *B66D 1/26* (2013.01); *F16D 11/04* (2013.01); *F16D 2011/002* (2013.01); *F16D 2011/004* (2013.01); *F16D 2011/006* (2013.01)

(58) Field of Classification Search
CPC .......... B66D 1/16; B66B 15/00; B66B 15/02; B66B 15/06; F16D 2011/004
See application file for complete search history.

(56) References Cited

U.S. PATENT DOCUMENTS 4,348,011 A * 9/1982 Honda .......................... 254/350

FOREIGN PATENT DOCUMENTS

CN  85201131 U  12/1986
CN  201746207 U  2/2011
(Continued)

OTHER PUBLICATIONS

P-50895-96 GOST Russian Technical Standard Jul. 1, 1997, 30 pages.

*Primary Examiner* — Richard Lorence
*Assistant Examiner* — Lillian Nguyen
(74) *Attorney, Agent, or Firm* — 24IP Law Group; Timothy R DeWitt

(57) ABSTRACT

The invention relates to a concealing device for the separable connection of the at least one loose drum rotatably mounted on the main shaft (11) of a conveyor machine to the main shaft (11), wherein the separable connection of the loose drum to the main shaft (11) is positively realized by means of a guided coupling wheel (3a, 3b) that is engageable and disengageable by actuating devices (7). The guidance of the coupling wheel (3a, 3b) is arranged on the sides of the loose drum.

14 Claims, 2 Drawing Sheets

(56) References Cited

FOREIGN PATENT DOCUMENTS

Figure 1:
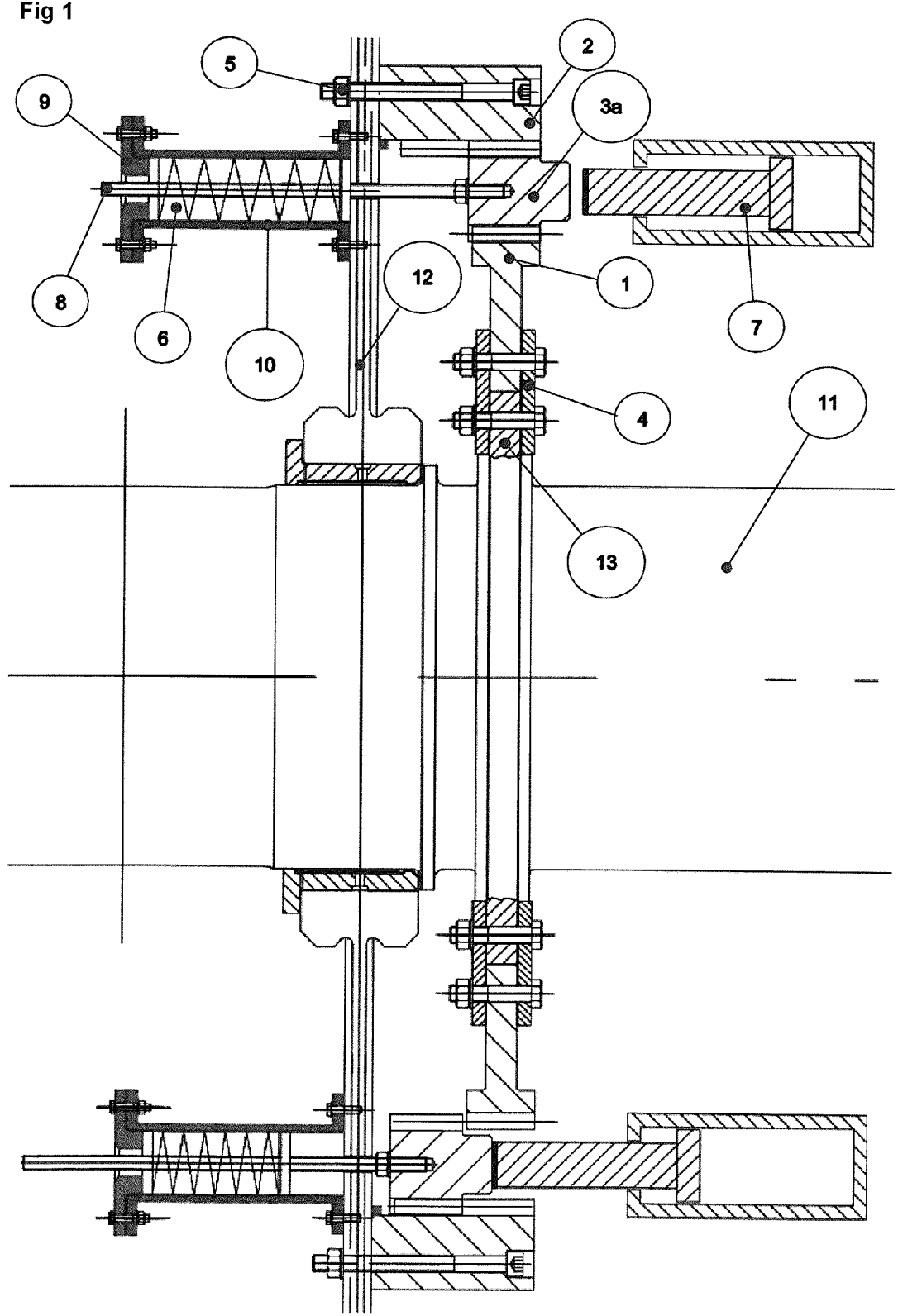

| | | |
|---|---|---|
| DE | 594707 | 3/1934 |
| DE | 922194 | 1/1955 |
| DE | 1200491 | 9/1965 |
| DE | 2943639 | 5/1981 |
| GB | 1401188 | 7/1975 |
| SU | 84889 | 11/1949 |
| SU | 882907 | 11/1981 |
| SU | 912620 | 3/1982 |
| SU | 1465407 | 3/1989 |
| SU | 1678743 | 9/1991 |

* cited by examiner

RESETTING DEVICE

The present invention relates to a resetting device for hoisting machines as described in the generic part of independent claim 1.

In shaft and slope hoisting machinery, so-called double-drum hoists or double-drum Blair hoists are used at low depths of up to 500 m and at great depths between 1,750 m to 3,000 m; these counteractively wind and unwind one or two ropes per drum.

As a rule, at least one of the drums is designed as a loose drum and the other as a fixed drum. The loose drum, which is rotatably mounted on the main shaft with guide bushings or roller bearings, is connected to the main shaft with a so-called resetting device.

This resetting device must be designed as a disengageable and controllable clutch so that at standstill, with the loose drum brake applied, the two drums can always be moved against each other.

Over the lifetime of hoisting ropes, their elongation and stretch changes due to stress in hoisting operations and due to their own weight. However, since the change in length always varies from one rope to another, it must be possible in two-drum hoisting operations to move the two drums of a double-drum hoist or a double-drum Blair hoist in relation to each other to ensure that the one hoist stands securely at the underground loading floor and the other hoist stands securely at the unloading location. One of the effects that can be achieved with the described constellation is the equalization of rope stretch at the loading and unloading locations.

At the same time, it can also happen in shaft and slope hoisting operations that the operation of hoisting the material has to be moved from one floor to another, either farther above or farther below. For that purpose, it must also be possible to move the two drums of the hoist in relation to each other to ensure that the one hoist stands at the unloading location while the other hoist stands at the loading location, each being at its underground floor at the same time. However, a device of the kind described herein also allows that different underground floors can be approached quickly and accurately while unloading takes place above ground.

Known resetting devices have, for example, a shaft wheel with external gear teeth and a drum wheel with internal gear teeth, whereby the two wheels are connected to each other via an axially movable coupling wheel with internal and external gear teeth.

The gears of the shaft wheel are always designed such that they serve as guide gears at a relatively close backlash and always remain engaged, also when the device is reset to a disengaged position.

The result of that construction is that during the machine's operation as well as during the resetting process, parts of the resetting device are rotating along which could actually stand still. These devices are controlled by a non-rotating offsetting collarsetting ring which is guided on the machine frame and moves the coupling wheel with interior and exterior gear teeth back and forth in axial direction and which can couple and uncouple the gear teeth. The offsetting collarsetting ring is actuated, for example, by two double action hydraulic cylinders which may also be coupled with the offsetting collarsetting ring via a knee lever system.

The disadvantage of that arrangement is that in normal hoisting operations there is always relative movement between the fixed offsetting collarsetting ring and the rotating coupling wheel. This relative movement leads to wear and tear and thus to the need of maintenance. Furthermore, those areas are potentials for malfunction.

Furthermore, the fact that the shaft wheel is provided with gear teeth has the disadvantage that when the shaft bends, this directly affects the gear teeth, which can cause the resetting device to jam.

It is therefore the object of the present invention to provide a state-of-the-art resetting device which avoids the above named disadvantages of known arrangements, which is as easily implemented as possible and which allows low-maintenance, safe and economical operation.

This problem is solved by means of a resetting device for the disengageable connection of the loose drum, which is rotatably mounted on the main shaft of a hoisting machine, to the main shaft on which in addition to the loose drum a second rope drum is provided as a fixed drum or as a second loose drum with its own resetting device, whereby the disengageable connection of the loose drum to the main drum is a positive connection by means of a guided coupling wheel that can be engaged and disengaged with actuating means. According to the invention, the guidance of the coupling wheel is arranged on the side of the loose drum.

Preferably, the coupling wheel is part of an arrangement consisting of the coupling wheel itself and a drum wheel connected to the loose drum and a shaft wheel connected to the main shaft.

With an arrangement of the described kind it is possible for the coupling wheel and the coupling sleeve as well as for the loose drum to stand still during the resetting process, such that only the main shaft, the fixed drum and the shaft wheel are rotating.

In a preferred version of the invention, the coupling wheel is guided via interlocking teeth, and it also preferred that the drum wheel has interior gear teeth and that the shaft wheel has external gear teeth with a working gear, whereby the coupling wheel is correspondingly interlocked. The coupling wheel is axially guided along the guiding gear teeth.

In an equally preferred version of the invention, the coupling wheel is guided via a cylindrical fitting with clearance, whereby the drum wheel and the shaft wheel have working gears with external gear teeth and the coupling wheel has corresponding internal gear teeth.

It is also preferred that the teeth of the shaft wheel have a curved shape to allow an adjustment of the gear teeth in an advantageous way if the main shaft should bend.

It is also preferred that the coupling wheel in engaged position is axially fixed by a number of spring elements. To fully utilize the advantages of the resetting device according to the invention, it is suggested to provide a sufficient number of the above named springs at equal distances within or outside the rope carrier or the loose drum such that in conjunction with the guide of the coupling wheel or the coupling sleeve on the drum wheel, the actuating means can be retracted in the operational stage such that in a normal hoisting operation they have no contact with the rotating parts and in particular with the coupling wheel.

In summary, a state-of-the-art resetting device is disclosed in which a shaft wheel with external gear teeth on the main shaft of the hoisting machine and another drum wheel with internal or external gear teeth on the side shield of the machine's rope carrier is firmly attached via a screw connection, and another coupling wheel, with either internal or external gear teeth or with internal gear teeth only, is axially movable and creates a positive connection between the shaft wheel and the drum wheel, whereby it is guided either by internal or external gear teeth or by a cylindrical fitting, and is disengaged from the gear teeth connection in axial direction via one or more electrical, hydraulic, pneumatic, electrohydraulic or other actuating means, also in conjunction with a linkage or knee lever system, and which after the resetting process is again fully automatically re-engaged and positioned in the gear teeth connection by means of several pre-tensioned spring packs of a predetermined size.

With the present invention it is possible to remove all relative movements from the system with the exception of the inevitable relative movements at the guide bushings or roller bearings with which the loose drum is mounted on the main shaft.

At the same time, the suggested arrangement improves the guidance of the coupling wheel or the coupling sleeve and thanks to the curved shape of the teeth, it prevents the jamming of the device.

During normal hoisting operations, actuation through the actuating means of the required kind requires no contact with the resetting device or other parts of the hoisting machine, such that all negative effects of such contact are completely eliminated from the start.

Figure 2:
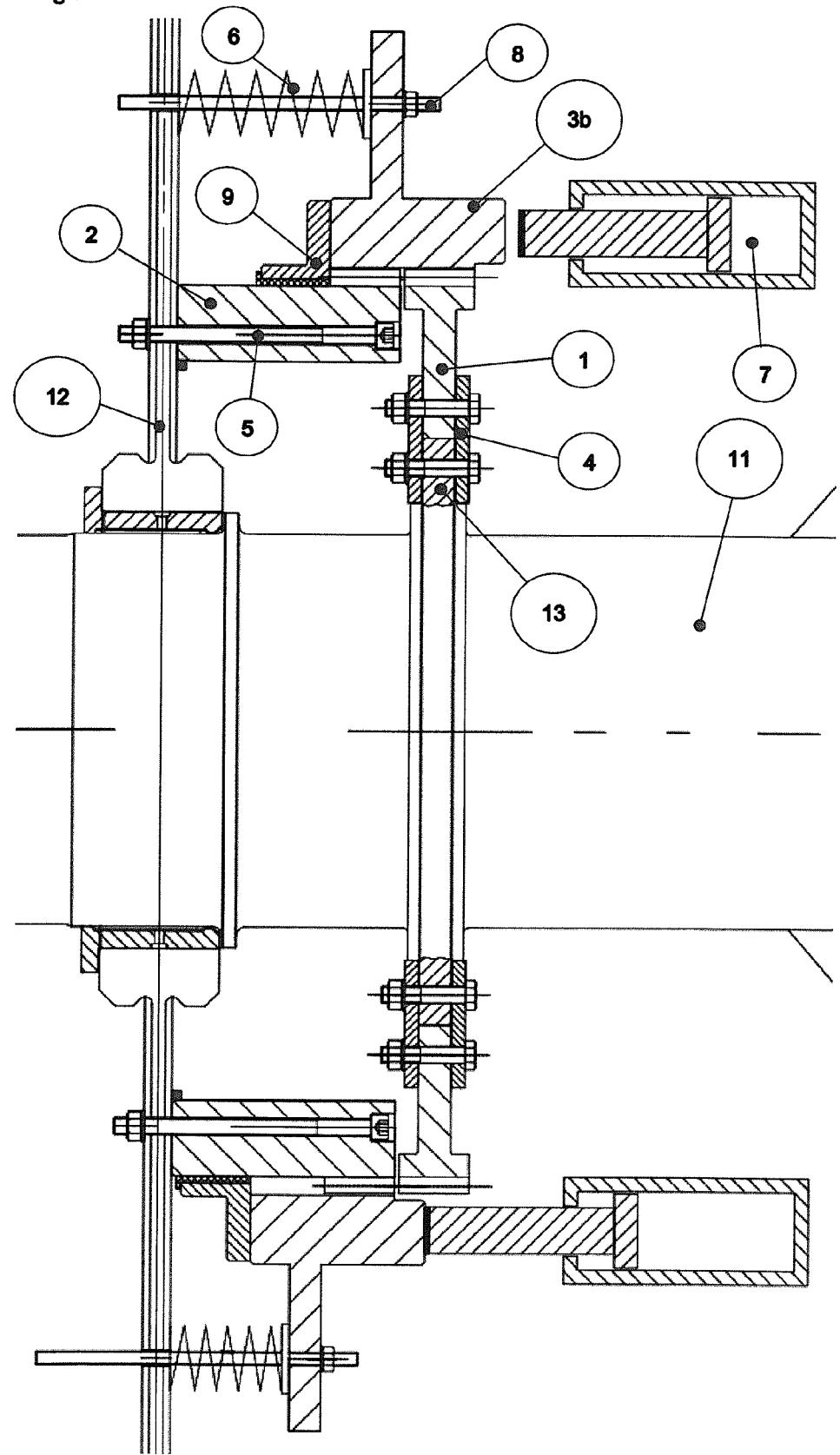

Other characteristics and advantages of the present invention are explained in the following by no means limiting description of embodiments of the invention in conjunction with the associated figures, where FIG. 1 shows a resetting device in disengaged and in engaged position, and FIG. 2 shows a variation of the resetting device shown in FIG. 1.

FIGS. 1 and 2 show two embodiments of the resetting device in accordance with the present invention. Both figures show the engaged position of the resetting device in the upper half and the disengaged position in the lower half Corresponding elements are marked with the same reference numbers.

As the figures show, in both versions the guidance of coupling wheel 3a with interior and exterior gear teeth and of coupling sleeve 3b with interior gear teeth are moved away from shaft wheel 1 to drum wheel 2.

Therefore coupling wheel 3a or coupling sleeve 3b stands still during the resetting process, and only the main shaft 11, the fixed drum (not shown) and the shaft wheel 1 are rotating.

Guidance on drum wheel 2 takes place either via suitable gearteeth (such as DIN 5480) as in FIG. 1 or via a cylindrical fitting with adapted clearance as shown in FIG. 2.

In the embodiment according to FIG. 1, i.e. with guidance in an involute spline gear with involute flanks (such as DIN 5480), drum wheel 2 has just such interior gear teeth and is flanged to side shield 12 of the rope carrier with a screw connection 5.

The shaft wheel 1 with exterior gear teeth is provided with a so-called working gear (for example according to DIN 867) with involute teeth with generous flange clearance and head clearance, and is flanged via a friction flange connection 4 to both sides of the shaft flange 13 on main shaft 11. The teeth of shaft wheel 1 have a curved shape to allow for adjustment within the gear teeth, should the main shaft 11 bend.

The actual coupling wheel 3a, which on the outside has associated counter gear teeth (for example according to DIN 5480) and on the inside has associated counter gear teeth (for example according to DIN 867), is axially guided via the guiding gear teeth and at the same time tensioned against a sufficient number of coil-spring or disk-spring packs 6 provided inside the rope carrier.

During normal operations, the actuating means 7 have no contact at all with coupling wheel 3a. Clearance is provided between both to prevent detrimental contact. Only during the resetting process when the rope carrier brake (not shown) is applied, are the actuating means 7 extended and press against the outer face of coupling wheel 3a. The working gear is completely separated at that time, the gearing guide remains intact, and at the same time the spring packs 6 inside the rope carrier are fully tensioned. For that purpose, the springs sit on a spring rod 8 provided with a turned-out collar that presses against the springs.

The counter bearing for this is located at spring cover 9 which is screwed into a spring cylinder 10 inside the rope carrier, where the springs are first tensioned at a defined torque and then fully tensioned upon disengagement. The through-hole on the side shield of the rope carrier for spring rod 8 is provided with so much clearance that the teeth and not the spring rods 8 are always first bearing the load against the side shield.

After the resetting has been done, the actuating means 7 are slowly retracted again, and the springs 6 lose their tension.

The ideal case is that the teeth of the working gear match each other so closely that they can be engaged again without contacting each other.

Should this not be the case, the advantage of springs 6 again comes to bear. By carefully disengaging the rope carrier brake, the gearing engages with a "snap" and with predetermined force as soon as a tooth of coupling wheel 1 has found "its" tooth gap on shaft wheel 1. After monitoring the complete coupling process with measuring instruments (not shown), the hoisting operation can continue.

If guidance is via a cylindrical fitting as shown in FIG. 2, the rear part of drum wheel 2 between the teeth and the side shield 12 of the rope carrier is provided with a clearance fit, the matching parts of which are two bushings 9 which lead to the coupling sleeve 3b with internal gear teeth. Drum wheel 2, which in this case has external gear teeth, and shaft wheel 1, which externally has bent teeth as in the solution according to FIG. 1, are fastened in analogy to the solution shown in FIG. 1, via direct screw connection 5 or flange 4.

The coupling sleeve 3b with internal gear teeth, just as the counter gear teeth on the drum wheel and the shaft wheel, is interlocked according to DIN 867 with generous flank clearance, and is tensioned against a sufficient number of springs 6 between side shield 12 of the rope carrier and the ring integrated outside in coupling sleeve 3b.

Just as with the version according to FIG. 1, the actuating means 7 have no contact at all with the coupling sleeve 3b during normal operation. There is clearance between the two to prevent detrimental contact.

Only when the resetting process with the rope carrier brake (not shown) is applied, are the actuating means 7 extended, and they press against the outer face of coupling sleeve 3b. At that time, the gear teeth are completely separated, the coupling sleeve is guided on the cylindrical fitting with clearance in direction of side shield 12 of the rope carrier, and at the same time the springs 6 outside the rope carrier are fully tensioned. For that purpose, the springs are placed on a spring rod 8 provided with a turned-out collar which presses against the springs 6.

The counter bearing for this is side shield 12 of the rope carrier. The through-hole for spring rod 8 at side shield 12 of the rope carrier must be provided with enough clearance so that the teeth and not the spring rods 8 are always first bearing the load against the side shield 12.

The invention claimed is:

1. A resetting device for a disengageable connection between at least one drum rotatably mounted on a main shaft of a shaft or slope hoisting machine and the main shaft, whereby the disengageable connection between the drum and the main shaft is accomplished as a positive connection with a guided coupling wheel engageable and disengageable with actuating means wherein a guidance of the coupling wheel is provided on the sides of the drum.

2. The resetting device according to claim 1, wherein the coupling wheel is part of an arrangement consisting of the coupling wheel, a drum wheel connected to the drum and a shaft wheel connected to the main shaft.

3. The resetting device according to claim 2, wherein the drum wheel is provided with by internal guiding teeth and that the shaft wheel is provided with a working gear of external gear teeth, whereby the coupling wheel has respective corresponding gear teeth.

4. The resetting device according to claim 3, wherein the coupling wheel is axially guided via the guiding gear teeth.

5. The resetting device according to claim 2, wherein the drum wheel and the shaft wheel have a working gear with external gear teeth, whereby the coupling wheel has corresponding internal gear teeth.

6. The resetting device according to claim 2, wherein the coupling wheel is tensioned against a number of spring elements arranged on the sides of the drum in engaged position.

7. The resetting device according to claim 1, wherein guidance of the coupling wheel is accomplished with gear teeth.

8. The resetting device according to claim 7, wherein the drum wheel is provided with by internal guiding teeth and that the shaft wheel is provided with a working gear of external gear teeth, whereby the coupling wheel has respective corresponding gear teeth.

9. The resetting device according to claim 8, wherein the coupling wheel is axially guided via the guiding gear teeth.

10. The resetting device according to claim 1, wherein the guidance of the coupling wheel is accomplished via a cylindrical fitting with adaptable clearance.

11. The resetting device according to claim 10, wherein the drum wheel and the shaft wheel have a working gear with external gear teeth, whereby the coupling wheel has corresponding internal gear teeth.

12. The resetting device according to claim 10, wherein the coupling wheel is tensioned against a number of spring elements arranged on the sides of the drum in engaged position.

13. The resetting device according to claim 1, wherein teeth of the shaft wheel have a curved shape.

14. The resetting device according to claim 1, wherein when the coupling wheel is engaged position, the actuating means are arranged such that they do not contact the coupling wheel.

\* \* \* \* \*